Feb. 27, 1934.   R. A. WOOD   1,948,555
LUMINAIR
Filed April 22, 1932   2 Sheets-Sheet 2

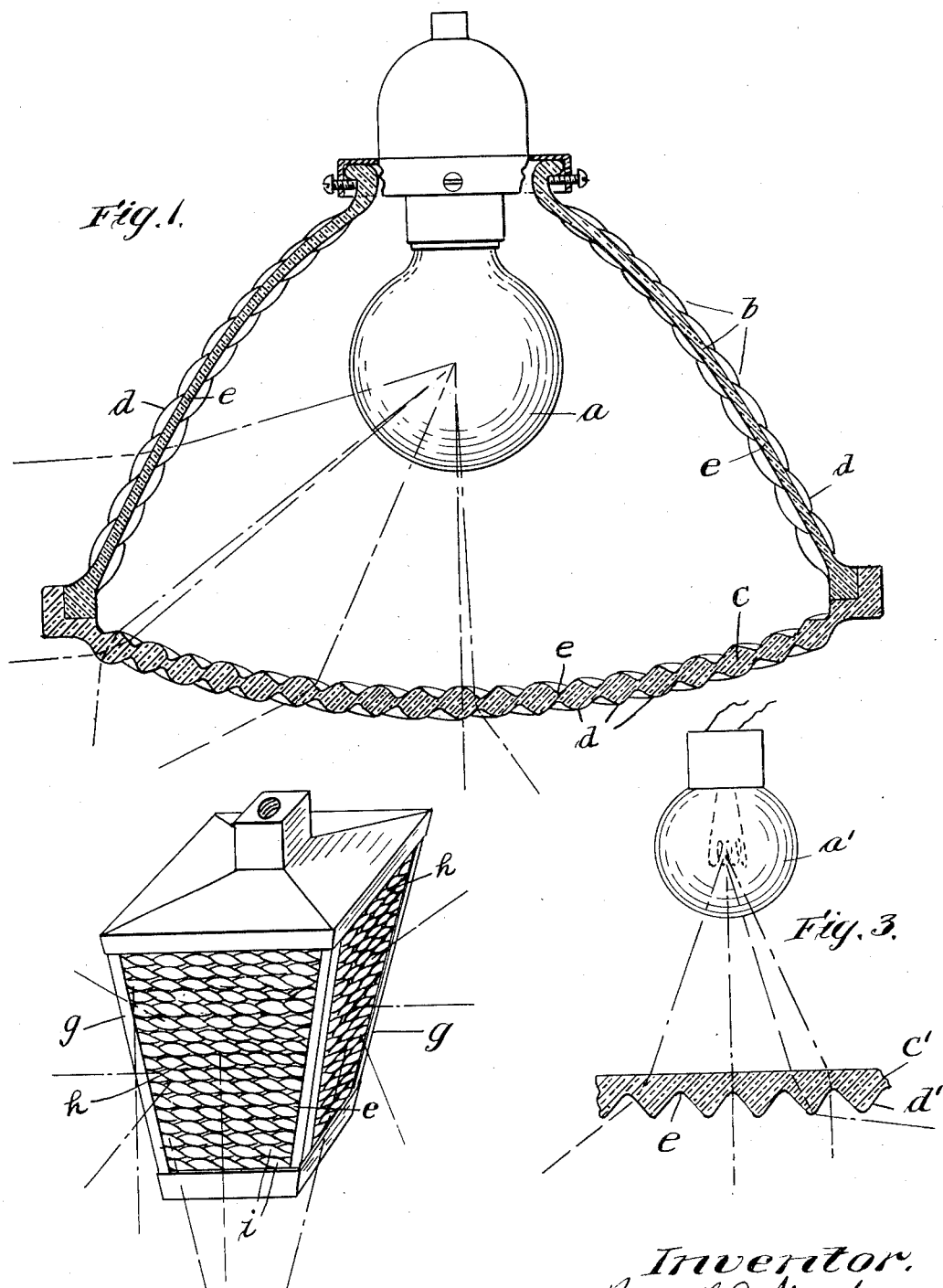

Inventor.
Russell A. Wood
by L. H. Harriman
Atty.

Patented Feb. 27, 1934

1,948,555

UNITED STATES PATENT OFFICE 1,948,555

LUMINAIR

Russell A. Wood, Cambridge, Mass.

Application April 22, 1932. Serial No. 606,920

8 Claims. (Cl. 240—106)

This invention relates to certain improvements in means for transmitting, refracting and diffusing light rays, more particularly when employed in connection with the illumination of highways, and large areas, where artificial lighting is required.

The object of my invention is to provide an effective means for diffusing and distributing light rays, which will enable the rays to be distributed through a wide angle with approximately uniform intensity.

I accomplish this object primarily by providing a refractor which consists of a transparent or translucent glass plate, on one or both surfaces of which are formed a series of transversely rounded ribs, which are arranged side by side in parallelism, and the surface of each of which is formed to correspond to one side of a helix or spiral, thereby providing the surface of each rib with alternately arranged concave grooves and convex projections which extend obliquely of the rib.

For a more complete disclosure of the invention, reference is made to the following specification, in connection with the accompanying drawings in which:—

Fig. 1 is a central vertical sectional view of a luminair embodying my invention.

Fig. 2 is a perspective view showing another embodiment thereof.

Fig. 3 is a detail view showing a modification of the invention.

Figure 4:
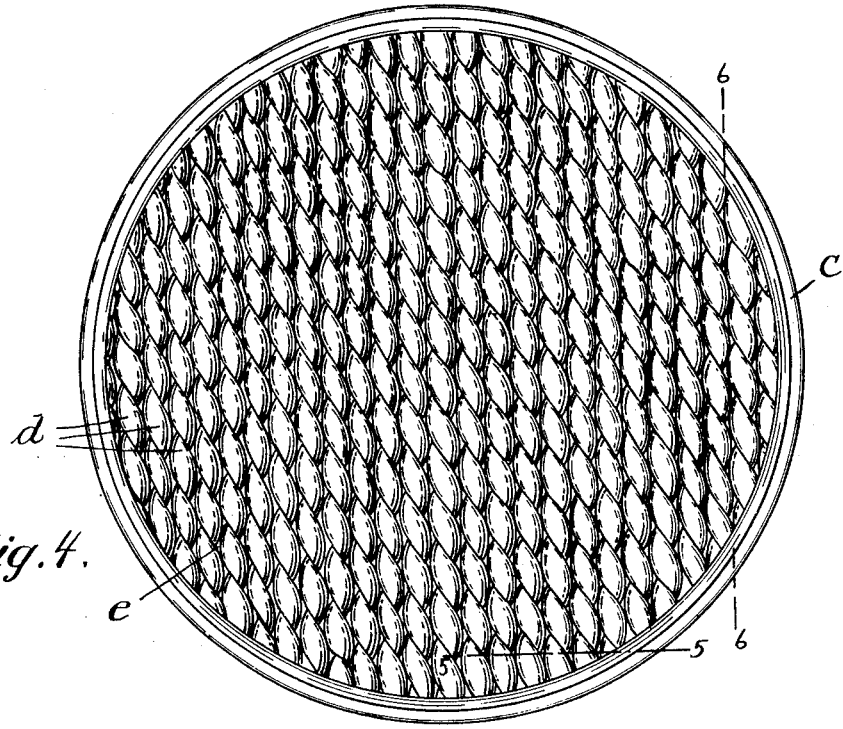
Fig. 4 is a bottom plan view of the luminair shown on Fig. 1.
Figure 5:
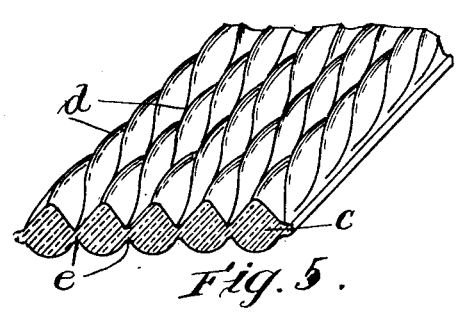
Figure 6:
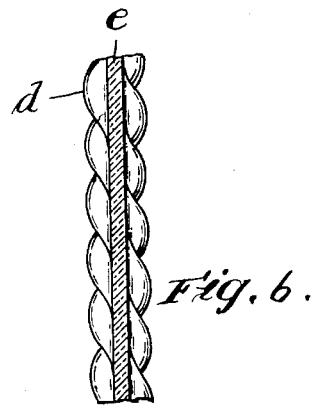

Figs. 5 and 6 are detail sectional views on the lines 5—5 and 6—6 of Fig. 4.

In the embodiment of the invention illustrated in Fig. 1, a source of light $a$, which may be an ordinary gas filled electric lamp, is enclosed by a bell-shaped shade $b$ and a refracting closure or refractor $c$, both of transparent or translucent glass.

According to my invention both surfaces of the glass sheet which forms the refractor $c$ may be considered as formed from a series of round rods $d$ arranged side by side each in contact with the two next adjacent and each having a helically, or spirally formed surface, throughout its entire length, said rods being connected by a web $e$ at points where they do not actually come in contact, on account of the spiral formation, so that they form a rigid, homogenous plate, each surface of which may be considered as having a series of half-round, or transversely rounded ribs, the surface of each of which corresponds to a longitudinally bisected spiral, thereby forming on each rib alternating transversely concave depressions and convex projections which extend obliquely thereof and have there surfaces blended, or extended continuously.

The construction of the shade $b$ is similar, except that on account of the conical, bell-like formation, the ribs taper in diameter as they extend from base to top.

With the above described construction, the light rays emanating from the source $a$ and passing through the refractor $c$ will be diffused in practically all directions through an angle of fully 180°, the concave surfaces on the refractor causing convergence of the rays at certain points and divergence, or diffusion at other points, the convergence and divergence of the rays varying according to the particular portion of the surface from which they emanate. A similar diffusion of the light rays passing through the shade $b$ will also be secured.

A modified form of refractor $c'$ is shown in Fig. 3, one side thereof being plane, or smooth and the other side being composed of spirally former ribs $d'$, of the formation already described.

With this construction the plane side of the plate will be arranged next the light source at the inner side of the luminair, as indicated. In this form the refraction of the light rays passing through the plate will not be as great as in the form in which the spirally formed ribs are on both sides of the plate, but in each instance the light rays passing through the glass will be diffused throughout an angle of approximately 180° in all directions.

In Fig. 2 another application of my invention is shown, which is considered particularly desirable for street illumination. As shown, a four sided frame $g$, of trunco-pyramidal form, is provided, which is closed at top and bottom and has flat glass plates $h$ set into each side, said plates having spirally formed ribs $i$ on their surfaces of the formation already described with the reference to the plate $c$. In this instance the spirally formed ribs $i$ of the plates $h$ are preferably extended horizontally as shown, although they will act to diffuse the light satisfactorily when held in other positions. In the construction shown both the top and bottom of the frame is closed with opaque material, so that all the light rays emanating from the source of light within the frame will pass through the side plates $h$ and will be diffused throughout the entire space at the outer side of the plane of each plate, and, as the plates are held in positions inclined from the vertical, the space beneath the luminair will be lighted by the refracted rays passing through the plates $h$, as indicated, although the bottom of the frame is of opaque material.

It will be understood that the uses shown are merely illustrative and that the construction of refractor shown may be used in various other relations.

I claim:

1. A luminair comprising a light source, a glass refractor therefor having one of its surfaces composed of a series of spirally formed ribs arranged side by side.

2. A luminair comprising a light source, a glass refractor in front of the light source having both of its surfaces composed of a series of spirally formed ribs arranged side by side.

3. A luminair comprising a light source, a glass refractor in front of said light source having its surface next the light source plane and its opposite surface composed of a series of spirally formed ribs arranged side by side.

4. A luminair comprising a light source, a glass refractor disposed in front of said light source and composed of a series of round, spirally formed sections arranged side by side in proximity and joined in a homogenous mass to provide both sides of the refractor with spirally formed ribs.

5. A luminair comprising a light source, and a refractor arranged in front of said light source consisting of a glass plate having its surface opposite the light source composed of a series of transversely rounded parallel ribs arranged side by side in close proximity, said ribs being of uniform width, and each having its surface formed of a series of transversely concave depressions alternated with a similar series of transversely convex projections extending in oblique relation thereto and having their surfaces continuous each with the next adjacent.

6. A luminair comprising a light source, and a refractor arranged in front of said light source consisting of a glass plate having transversely rounded ribs on its surface opposite the light source arranged side by side in close proximity, each rib having its surface composed of a series of alternating, transversely concave depressions and convex projections extending obliquely thereof and having their surfaces continuous.

7. A refractor for the purposes described consisting of a glass plate having a series of transversely rounded ribs formed on one of its surfaces and arranged side by side in close proximity, each rib having its surface composed of alternately arranged transversely concave depressions and convex projections extending obliquely thereof and having their surfaces continuous.

8. A refractor for the purposes described consisting of a glass plate having a series of half-round ribs formed on one of its surfaces and arranged side by side in close proximity, each rib having its surface constructed in the form of a longitudinally divided helix, to form obliquely disposed, continuously extending, alternately arranged concave and convex surfaces thereon.

RUSSELL A. WOOD.